United States Patent [19]

Ike

[11] Patent Number: 5,054,112
[45] Date of Patent: Oct. 1, 1991

[54] ELECTRONIC DATA COLLECTION SYSTEM

[75] Inventor: Toshimasa Ike, Tokyo, Japan

[73] Assignee: Seiko Instruments Inc., Japan

[21] Appl. No.: 320,172

[22] Filed: Mar. 7, 1989

[30] Foreign Application Priority Data

Mar. 16, 1988 [JP] Japan ................................. 63-62893

[51] Int. Cl.$^5$ ............................................. H04B 5/02
[52] U.S. Cl. ...................................... 455/41; 455/277
[58] Field of Search ...................... 455/41, 93, 95, 133, 455/277, 278, 8, 49, 50, 123; 364/401, 403, 406; 381/79; 340/825.72, 825.69

[56] References Cited

U.S. PATENT DOCUMENTS 4,332,032  5/1982  Daniel .................................. 455/277
4,415,065 11/1983  Sandstedt ........................... 364/401

FOREIGN PATENT DOCUMENTS 1374435  2/1988  U.S.S.R. ................................ 455/52

Primary Examiner—Reinhard J. Eisenzopf
Assistant Examiner—Edward Urban
Attorney, Agent, or Firm—Bruce L. Adams; Van C. Wilks

[57] ABSTRACT

An electronic data collection system for managing and controlling information in a restaurant comprises a portable data entry device and an information processing apparatus. The portable data entry device receives data entered by an operator and relays the data to the information processing apparatus by wireless bi-directional communication. The wireless bi-directional communication comprises either a radio communication mode or an electromagnetic induction communication mode. The communication between the portable data entry device and the information processing apparatus is normally effected by the radio communication mode. In the event communication errors occur under the influence of various noises during the communication, the electronic data collection system changes from the radio communication mode to the electromagnetic induction communication mode.

3 Claims, 4 Drawing Sheets

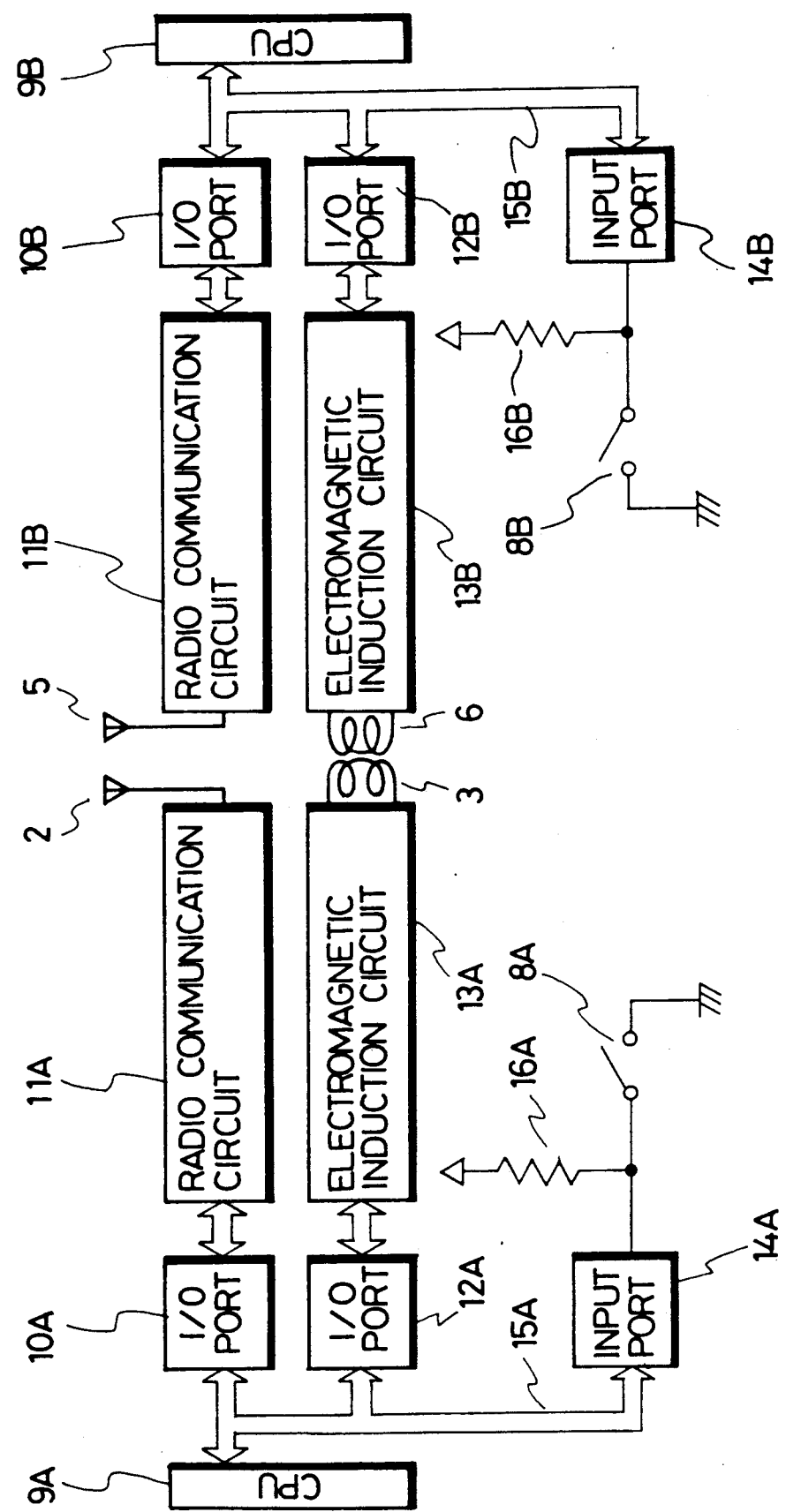

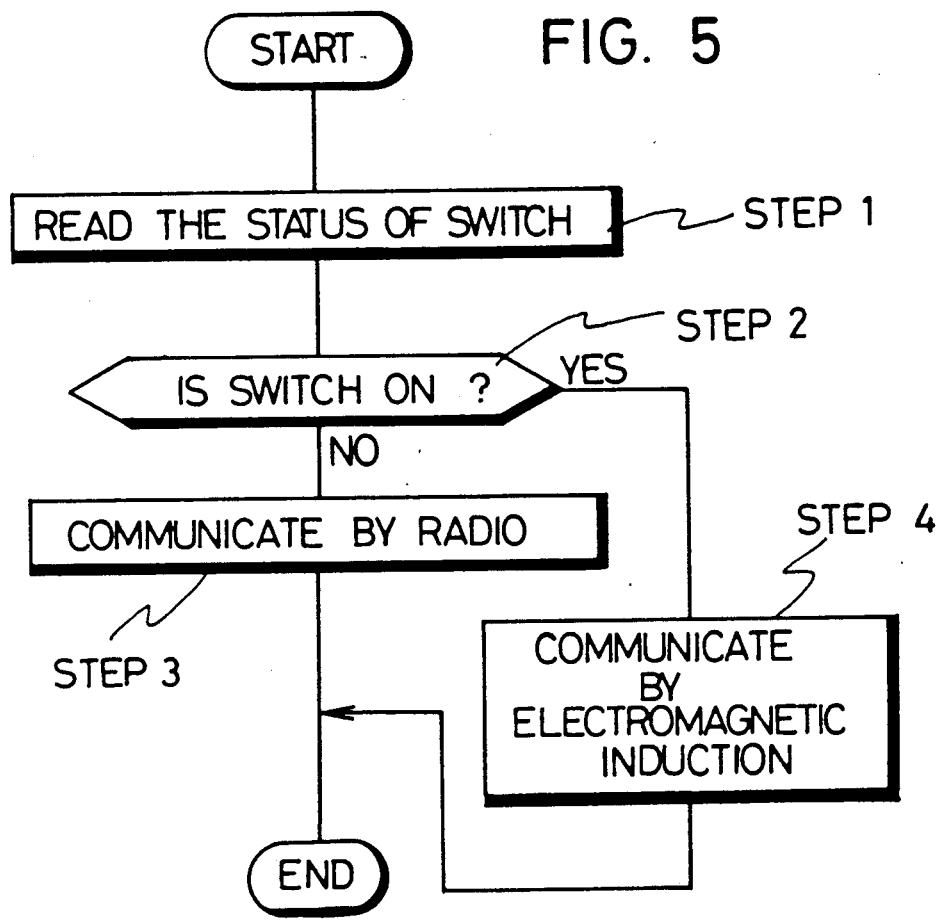

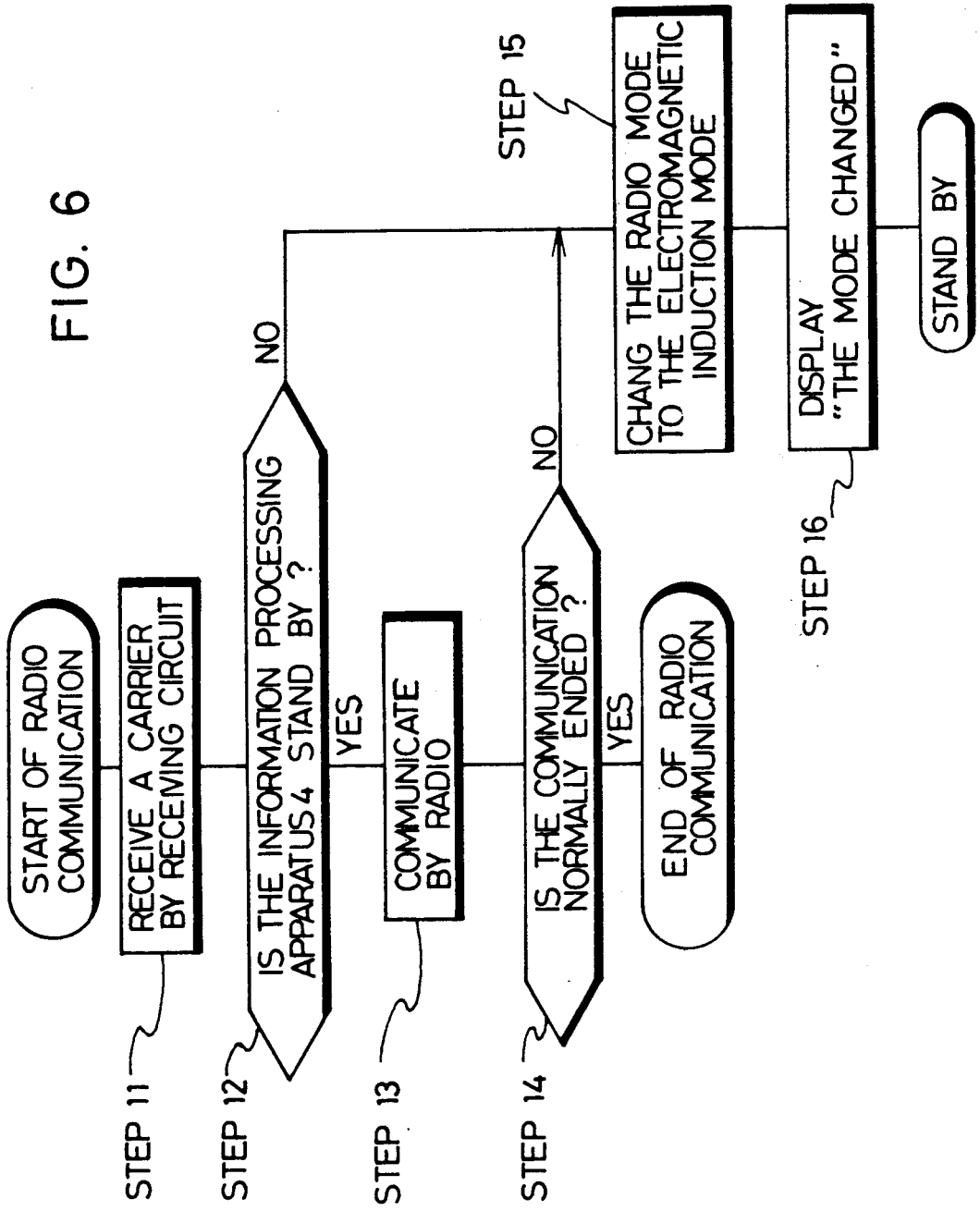

ELECTRONIC DATA COLLECTION SYSTEM

BACKGROUND OF THE INVENTION

1. Field of the Invention

The present invention relates to an electronic data collection system for managing and controlling information in a restaurant. More particularly, the present invention relates to an improvement in such system which has a radio communication mode and another communication mode by electromagnetic induction, and has a function of changing from one communication mode to the other.

2. Description of the Prior Art

Various types of interactive systems are known employing portable data entry devices which communicate with information processing apparatus. Gary O. Sandstedt, U.S. Pat. Nos. 4,415,065 and 4,569,421 disclose a vending system particularly adapted for a restaurant which includes hand held portable data entry devices and an information processing apparatus. The hand held portable data entry devices also include wireless transceiver apparatus for bi-directional communications with the information processing apparatus. However, radio waves used in such a data collection system having a wireless communication function are generally liable to be influenced by various noises external the system. The drawback of this system is that an information transfer becomes impossible when errors occur under the influence of various noises during the transfer of information between the hand held portable data entry devices and the information processing apparatus.

SUMMARY OF THE INVENTION

An object and advantage of the present invention is to provide a novel data collection system which comprises portable data entry devices and information data processing apparatus communicating with one of the portable data entry devices by airwave transmission.

Another object of the present invention is to provide a novel data collection system which is generally free from trouble caused by various noises external to the system.

A further object of the present invention is to provide a data collection system which has a radio communication mode and an electromagnetic induction communication mode, and has a function of changing from the radio communication mode to the other communication mode by electromagnetic induction when errors occur under the influence of various noises while one of the information data processing apparatus communicates with one of the portable data entry devices.

The above and other related, objects and features of the invention will be apparent from the following description of the disclosure in conjunction with the accompanying drawings and the novelty thereof is pointed out in the appended claims.

BRIEF DESCRIPTION OF THE DRAWINGS

FIG. 4 is circuit block diagram of the portable data entry device and the information processing apparatus according to the present invention;

FIG. 5 is a flowchart of a communication mode changeover process depending on whether the switches 8A and 8B are on or not; and FIG. 6 is a flowchart of a communication mode changeover process in which the radio communication mode changes to the electromagnetic induction communication mode when errors occur under the influence of various noises.

DESCRIPTION OF THE PREFERRED EMBODIMENT

Figure 1:
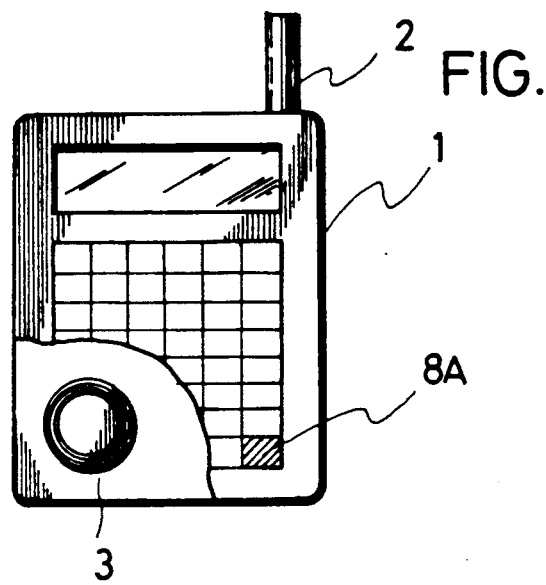
FIG. 1 is an elevation partly in section of a portable data entry device according to the present invention.
Figure 2:
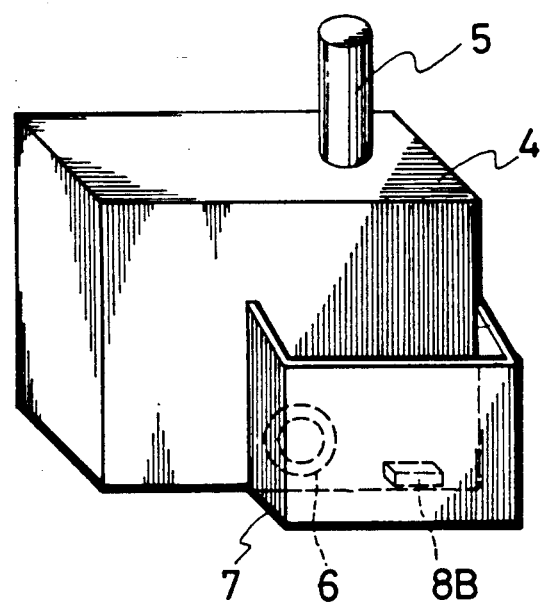
FIG. 2 is a perspective view of a data processing apparatus according to the present invention.

Embodiments of the present invention will now be described with reference to the drawings. In FIG. 1, a portable data entry device 1 has an antenna 2 for radio wave communication and a coil 3 for electromagnetic induction communication. This electromagnetic induction communication coil 3 is built in the portable data entry device 1 so that it is invisible from outside. Likewise, an information processing apparatus 4, as shown in FIG. 2, for communicating with the portable data entry device 1, has a radio wave communication antenna 5 and an electromagnetic induction communication coil 6.

FIG. 4 shows a circuit block diagram of the portable data entry device 1 and the information processing apparatus 4. The portable data entry device 1 has the switch 8A, a pull-up resister 16A, an input port 14A, the bus line 15A, a CPU 9A, I/O port 10A and 12A, a radio communication circuit 11A, the antenna 2, an electromagnetic induction circuit 13A, and the coil 3. The switch 8A which is disposed on a surface of the portable data entry device 1 is of an alternate operation type. The information processing apparatus 4 has the same circuit block as the portable data entry device 1, but a switch 8B of the information processing apparatus 4 is of a momentary operation type.

Figure 3:
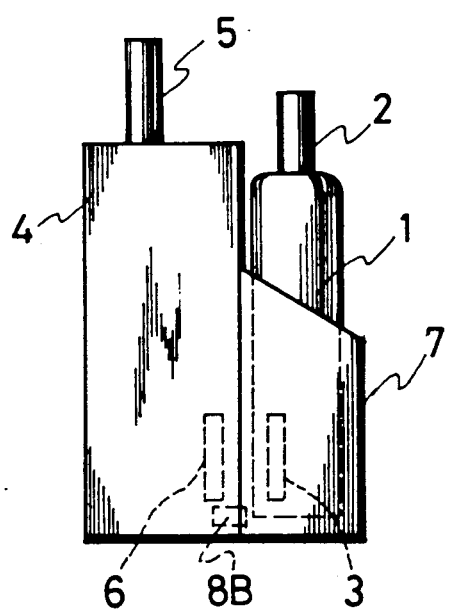
FIG. 3 is a side elevation view showing an embodiment on a communication mode by electromagnetic induction between the portable data entry device and the information processing apparatus according to the present invention.

An example of a changeover of the communication mode using the switches 8A and 8B will now be described. When the switch 8A of the portable data entry device 1 is depressed by an operator, the CPU 9A reads information representing the state of the switch 8A through the input port 14A and the bus line 15A. The CPU 9A selects the electromagnetic induction communication in accordance with the state of the switch 8A. Since the CPU 9A is coupled with I/O port 10A and another I/O port 12A respectively, it is possible to select one of these communication modes and to execute the selected communication mode. In order to perform electromagnetic induction communication, the portable data entry device 1 is inserted in an electromagnetic induction communication pocket 7 of the information processing apparatus 4 as shown in FIG. 3. The electromagnetic induction communication coils 3 and 6 are put in close proximity to each other, thereby making the electromagnetic induction communication possible. At this time, the portable data entry device 1 turns on a switch 8B disposed on the data processing apparatus 4 by virtue of its weight, so that the mode of communication is changed from a radio communication mode to an electromagnetic induction communication mode.

The flowchart of FIG. 5 shows the process of changeover of the communication mode performed in the CPUs 9A and 9B according to the state of switches 8A and 8B. The CPUs 9A and 9B respectively read the state of the switches 8A and 8B through the input ports 14A and 14B at the beginning of data communication as shown in step 1. The CPUs 9A and 9B decide whether the switches are ON or OFF as shown in step 2. When the state of the switches are OFF, communication between the portable data entry device 1 and the information processing apparatus 4 is completed in the radio communication mode as shown in step 3. The radio communication is performed by the radio communication circuits 11A and 11B. When the state of the switches are ON, communication between the portable data entry device 1 and the information processing apparatus 4 is completed in the electromagnetic induction mode as shown in step 4. Electromagnetic induction communication is performed by the electromagnetic induction circuit 13A and 13B.

In order to terminate the electromagnetic induction communication, the switch 8A of the alternate operation type is depressed again so that the radio communication mode is recovered upon turning-off the switch 8A. In the information processing apparatus 4, the switch 8B of the momentary operation type is turned off by taking the portable data entry device out of the electromagnetic induction communication pocket 7; as a result, the radio communication mode is recovered similarly.

In the portable data entry device 1, in place of the communication mode changeover implemented by the switches 8A and 8B as described above, the changeover of communication mode can also be carried out automatically by the CPUs 9A and 9B in accordance with the self-decision thereof without reference to the state of the switches. FIG. 6 is a flowchart of a communication mode changeover process in which the radio communication mode is automatically changed to the electromagnetic induction communication mode by the CPUs 9A and 9B without reference to the state of the switches. In step 11, the radio communication circuit 11A of the data entry device 1 receives a carrier having a frequency corresponding to one of the information processing apparatus 4. The CPU 9A checks whether the information processing apparatus 4 to be communicated with is on stand by or not as shown in step 12. If the information processing apparatus 4 is on stand by, the data entry device 1 communicates with the information processing apparatus 4 by the radio communication as shown in step 13. However, when the information processing apparatus 4 is not on stand by at the time of the carrier sensing operation in step 12 or when the radio communication processing has terminated with abnormality in step 14, the CPU 9A and 9B change the mode of communication to the electromagnetic induction communication mode as shown in step 15. The CPU 9A notifies the operator of such a changeover of the communication mode, using a display or the like disposed on the surface of the data entry device 1 as shown in step 16. In this case, the electromagnetic induction communication mode is kept in the state in which the reception of an electromagnetic induction communication start signal from the information processing apparatus 4 is awaited.

Then, after judging through the display or the like that the portable data entry device 1 has changed to the electromagnetic induction communication mode, the operator inserts the portable data entry device 1 in the electromagnetic induction communication pocket 7 of the information processing apparatus 4 to bring about the electromagnetic induction communication. As a result, the information processing apparatus 4 sends the electromagnetic induction communication start signal to the portable data entry device 1 by means of the electromagnetic induction communication, so that the electromagnetic induction communication is started between the device 1 and the apparatus 4.

As described above, the present invention adds the electromagnetic induction communication function to the data collection system having the radio wave communication function; thus, even when radio wave communication becomes impossible by various noises, the data collection system can transfer the information between the portable data entry device 1 and the information processing apparatus 4.

What is claimed is:

1. An electronic data collection system comprising: a portable data entry device and an information processing apparatus provided separately from said portable data entry device;

said portable data entry device comprising data entry means for entering data into said portable data entry device, first selectable communication means for outputting the entered data to said information processing apparatus and for receiving data from said information processing apparatus when selected by radio communication, second selectable communication means for outputting the entered data to said information processing apparatus and for receiving data from said information processing apparatus when selected by electromagnetic induction communication, and first selecting means coupled with said data entry means, first communication means and second communication means for selecting said first communication means and said second communication means to select a communication mode out of a radio communication mode and an electromagnetic induction communication mode;

said information processing apparatus comprising third selectable communication means for communicating with said first selectable communication means of aid portable data entry device by radio communication, fourth selectable communication means for communicating with aid second selectable communication means of said portable data entry device by electromagnetic induction communication, and second selecting means coupled with said third selectable communication means and fourth selectable communication means for selecting a communication mode out a radio communication mode and an electromagnetic induction communication mode.

2. An electronic data collecting system according to claim 1; wherein said data entry means of said portable data entry device has first switch means coupled with said first selecting means for determining the communication mode.

3. An electronic data collecting system described in claim 1; wherein said information processing apparatus further comprises second switch means coupled with said second control means for determining the communication mode.

* * * * *